(12) United States Patent
Burton et al.

(10) Patent No.: US 8,330,611 B1
(45) Date of Patent: Dec. 11, 2012

(54) POSITIONAL LOCATING SYSTEM AND METHOD

(75) Inventors: Bruce J. Burton, Grosse Pointe Farms, MI (US); Paul G. Duckworth, Holland, MI (US); Ryan D. Johnson, Grand Haven, MI (US); Warren Guthrie, West Olive, MI (US)

(73) Assignee: AvidaSports, LLC, Harper Woods, MI (US)

( * ) Notice: Subject to any disclaimer, the term of this patent is extended or adjusted under 35 U.S.C. 154(b) by 570 days.

(21) Appl. No.: 12/657,217

(22) Filed: Jan. 15, 2010

Related U.S. Application Data

(60) Provisional application No. 61/205,146, filed on Jan. 15, 2009, provisional application No. 61/287,361, filed on Dec. 17, 2009.

(51) Int. Cl.
*G08B 21/00* (2006.01)

(52) U.S. Cl. ............. 340/686.1; 340/573.1; 340/539.13; 340/539.11; 382/103; 382/115; 348/156; 348/157

(58) Field of Classification Search ............... 340/686.1, 340/573.1, 572.1, 539.13, 539.11; 382/103, 382/190, 115; 348/157, 156, 159, 564
See application file for complete search history.

(56) References Cited

U.S. PATENT DOCUMENTS

| | | | |
|---|---|---|---|
| 3,846,704 A | 11/1974 | Bessette | |
| 4,752,764 A | 6/1988 | Peterson et al. | |
| 5,218,344 A | 6/1993 | Ricketts | |
| 5,367,286 A | 11/1994 | Voillat | |
| 5,436,611 A | 7/1995 | Arlinghaus, Jr. | |
| 5,513,854 A | 5/1996 | Daver | |
| 5,524,637 A | 6/1996 | Erickson | |
| 5,696,481 A | 12/1997 | Pejas et al. | |
| 6,009,358 A | 12/1999 | Angott et al. | |
| 6,086,379 A | 7/2000 | Pendergast et al. | |
| 6,148,262 A | 11/2000 | Fry | |
| 6,440,067 B1 | 8/2002 | DeLuca et al. | |
| 6,569,011 B1 | 5/2003 | Lynch et al. | |
| 6,600,407 B2 | 7/2003 | Paek | |
| 6,611,788 B1 | 8/2003 | Hussa | |
| 6,710,713 B1 * | 3/2004 | Russo | 340/573.1 |
| 6,955,542 B2 | 10/2005 | Roncalez et al. | |
| 7,295,106 B1 * | 11/2007 | Jackson et al. | 340/517 |
| 7,693,310 B2 * | 4/2010 | Kato et al. | 382/118 |
| 7,857,708 B2 * | 12/2010 | Ueda et al. | 473/257 |
| 8,194,924 B2 * | 6/2012 | Pryor | 382/103 |
| 8,237,574 B2 * | 8/2012 | Anderson et al. | 340/573.6 |
| 2003/0087220 A1 | 5/2003 | Bessette | |
| 2003/0095186 A1 | 5/2003 | Aman et al. | |
| 2004/0165754 A1 * | 8/2004 | Tabata | 382/118 |
| 2004/0225199 A1 | 11/2004 | Evanyk et al. | |
| 2005/0013467 A1 * | 1/2005 | McNitt | 382/107 |
| 2005/0093976 A1 * | 5/2005 | Valleriano et al. | 348/143 |
| 2005/0185823 A1 * | 8/2005 | Brown et al. | 382/103 |
| 2005/0186542 A1 | 8/2005 | Roncalez et al. | |
| 2006/0040679 A1 * | 2/2006 | Shikano et al. | 455/457 |
| 2006/0093185 A1 * | 5/2006 | Kato et al. | 382/103 |
| 2007/0026974 A1 * | 2/2007 | Marty et al. | 473/467 |
| 2008/0170750 A1 * | 7/2008 | Gordon | 382/103 |

(Continued)

*Primary Examiner* — Hoi Lau
(74) *Attorney, Agent, or Firm* — Brooks Kushman P.C.

(57) ABSTRACT

A method and system are disclosed for locating or otherwise generating positional information for an object, such as but not limited generating positional coordinates for an object attached to an athlete engaging in an athletic event. The positional coordinates may be processed with other telemetry and biometrical information to provide real-time performance metrics while the athlete engages in the athletic event.

20 Claims, 5 Drawing Sheets

U.S. PATENT DOCUMENTS

| | | | |
|---|---|---|---|
| 2009/0022369 A1* | 1/2009 | Satoh et al. | 382/106 |
| 2009/0303055 A1* | 12/2009 | Anderson et al. | 340/573.6 |
| 2010/0157062 A1* | 6/2010 | Baba et al. | 348/156 |
| 2011/0038549 A1* | 2/2011 | Shirakawa | 382/209 |
| 2011/0222726 A1* | 9/2011 | Ruan | 382/103 |
| 2012/0045149 A1* | 2/2012 | Arai et al. | 382/296 |
| 2012/0128241 A1* | 5/2012 | Jung | 382/165 |
| 2012/0154582 A1* | 6/2012 | Johnson et al. | 348/143 |

\* cited by examiner

Fig. 3

POSITIONAL LOCATING SYSTEM AND METHOD

CROSS-REFERENCE TO RELATED APPLICATIONS

This application claims the benefit of U.S. provisional application Ser. No. 61/205,146 filed Jan. 15, 2009, the disclosure of which is hereby incorporated in its entirety, and U.S. provisional application Ser. No. 61/287,361 filed Dec. 17, 2009, the disclosure of which is hereby incorporated in its entirety.

BACKGROUND OF THE INVENTION

1. Technical Field

The present invention relates to systems and methods of positionally locating moving objects and real-time generation of telemetry and performance metrics for the moving objects.

2. Background Art

Global positioning system (GPS) can be used to positionally locate a moving object. GPS relies on a GPS enabled device attached to the object to calculate positional coordinates based on information transmitted from orbiting satellites. The reliance on orbiting satellites can be problematic while the moving object is within a covered area since the GPS enabled device may not receive the signals necessary to perform its coordinate calculations.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 3 illustrates performance telemetry in accordance with one non-limiting aspect of the present invention;

DETAILED DESCRIPTION OF THE PREFERRED EMBODIMENT(S)

Figure 1:
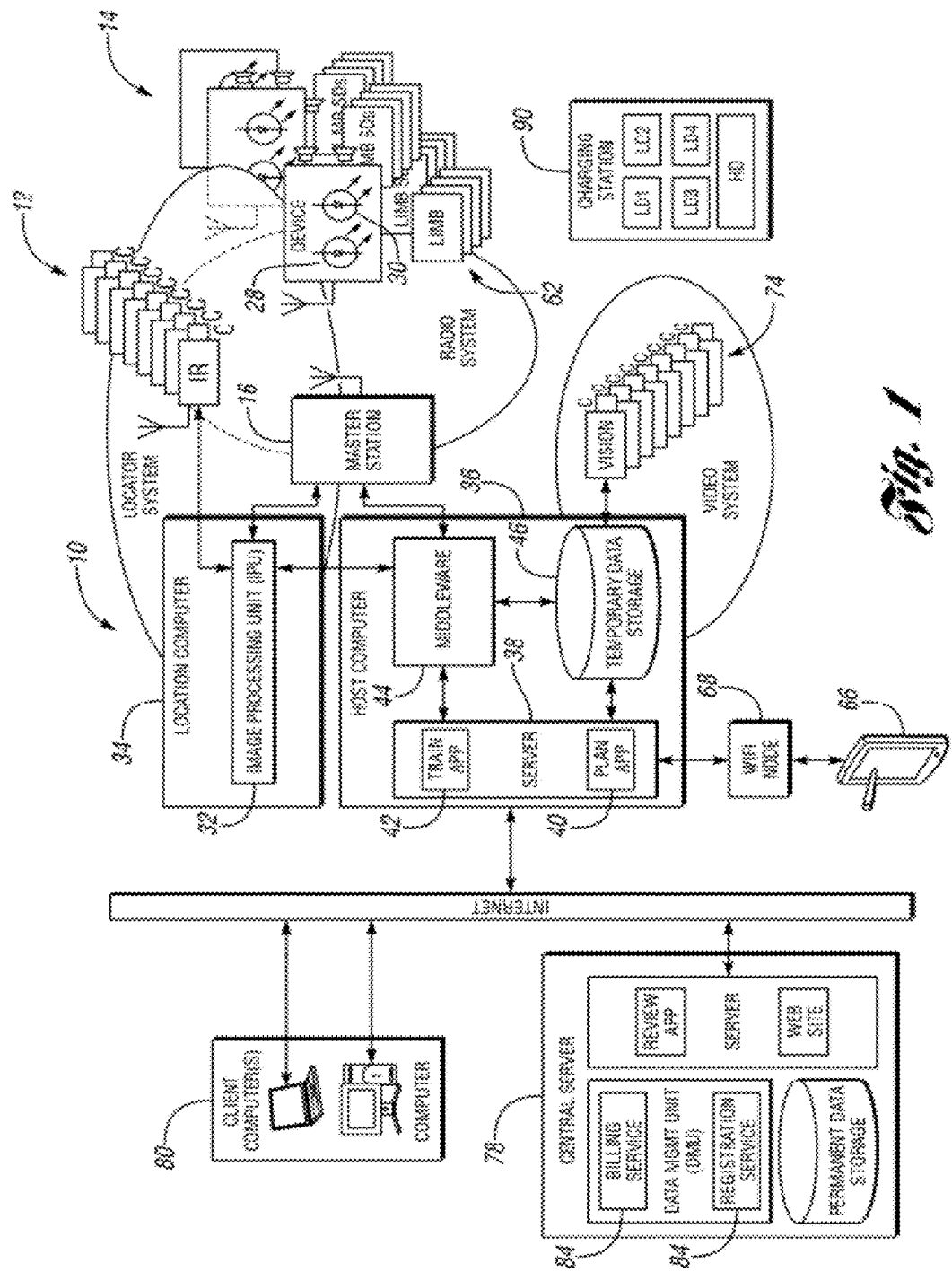
FIG. 1 illustrates a locating system in accordance with one non-limiting aspect of the present invention.

FIG. 1 illustrates a locating system 10 in accordance with one non-limiting aspect of the present invention. The system 10 may include on one or more cameras 12 to facilitate locating one or more devices 14 as the devices 14 travel within an area covered by the cameras 12. The description set forth below is predominately described with respect to the cameras 12 being positioned around a swimming pool in order to facilitate locating the devices 14 while the devices 14 are being worn by swimmers swimming within the swimming pool. In this example, the devices 14 are referred to as head devices 14 and a master station 16 may be configured to facilitate control of the head devices while the cameras 12 capture related images in order to determine a position of the swimmers with the swimming pool. The position of each swimmer can be calculated from a spatial reduction of the signals captured within the images to particular positions within the pool.

Figure 2:
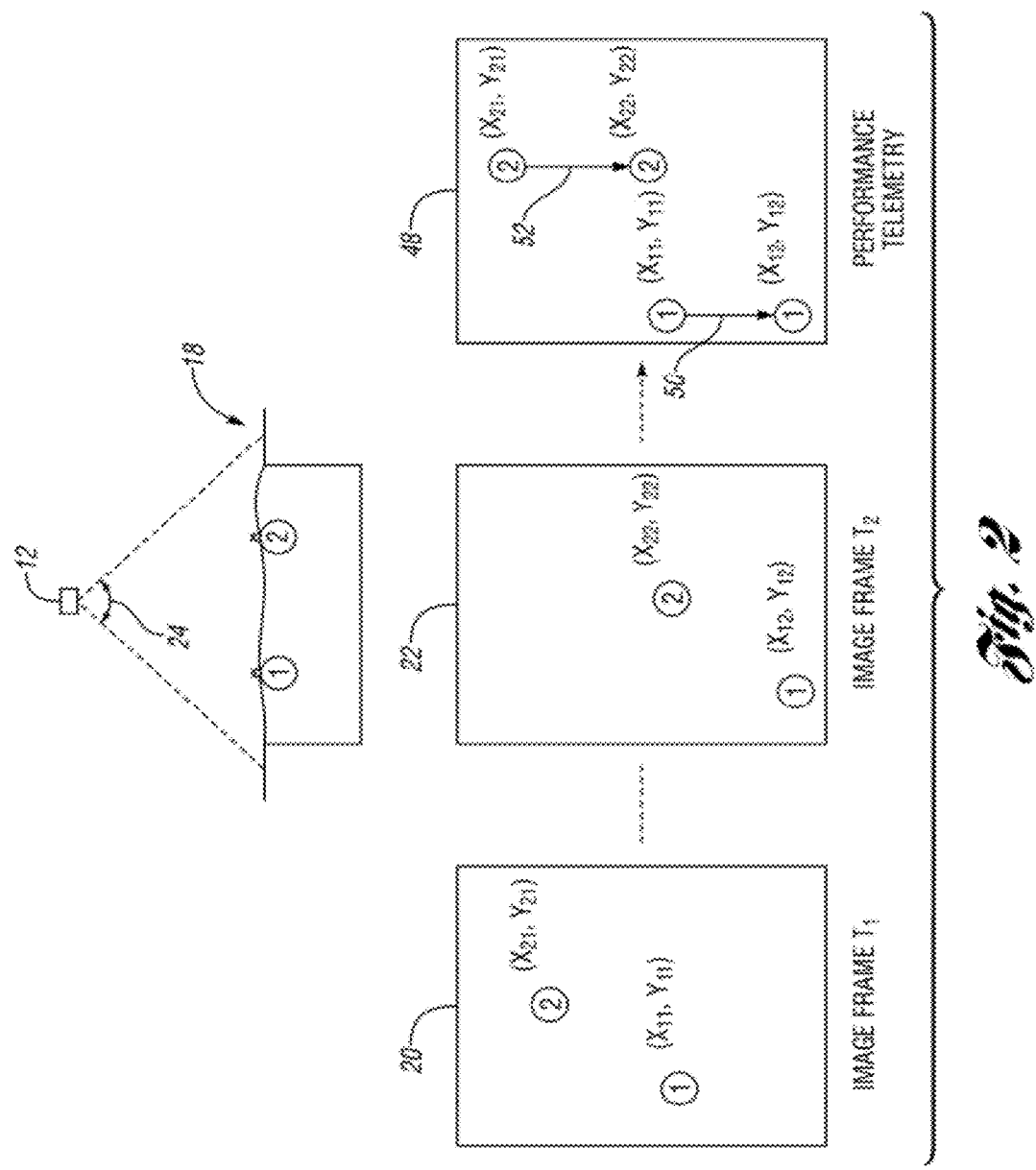
FIG. 2 illustrates spatial reduction in accordance with one non-limiting aspect of the present invention.

FIG. 2 schematically illustrates one example of the spatial reduction technique contemplated by the present invention where one of the cameras 12 may be positioned relative to a swimming pool 18 to capture image frames 20, 22 of events taking place within its viewing angle 24. While the present invention fully contemplates the image frames 20, 22 including visual and/or non-visual representations of any captured signals, the images frames shown in FIG. 2 represent images frames 20, 22 captured with an infrared (IR) camera 12 configured to capture IR or other non-visible representations of signals emitted from one or more beacons 28, 30 included on head devices 14 of on a first and second swimmer (1, 2) that happen to be swimming in the area covered by the camera's viewing angle 24 at a first time ($T_1$) and second time ($T_2$). The camera 12 may include a filter or other configuration particularly suited to capturing the signals emitted from the beacons 28, 30.

The first image frame 20 captured at time $T_1$ and the second image frame 22 captured are time $T_2$ are shown to be of the type where the camera 12 was configured to filter signals other than those that correspond with the beacons 20, 22. The captured signals are shown with circular representations for exemplary purposes only. Depending on the resolution of the camera 12, the wavelength and strength of the signal may exhibit some other pattern or representation within one or more of pixels (not shown) of the image frames 20, 22. A pixel-by-pixel analysis of the image frames 20, 22 may be performed with an image processing element 32 (see FIG. 1) of the master station 16 to identify the pixels that represents receipt of the strongest signal. Depending on the positioning of the camera 12 at the time the image frames 20, 22 were captured, each of the pixels can be associated with a particular area within the viewing angle 24, i.e., to a particular location/position within the pool 18. The pixel having the strongest signal can act as a center for coordinate generation purposes.

The arrangement shown in FIG. 2 includes the camera 12 being set a fixed position above the swimming pool 18 in order to simplify the spatial reduction of the images captured within the image frames 20, 22 to particular areas in the pool 18. Since the position of the camera 12 is know and fixed, a limited number of calculations are needed to associate each pixel of the image frames 20, 22 with a known portion of the swimming pool 18. This example, however, is not intended to limit the scope and contemplation of the present invention. The present invention fully contemplates the camera 12 moving such that additional processing may be required to fix the position of the camera 12 at the time of image capture before the areas associated with each image pixel could be identified with a particular area of the swimming pool 18.

Each of the pixels chosen to be representing the center of the emitted signals may be associated with an X-axis and Y-axis coordinate value according to an identity of the swimmer (shown as swimmer #1 and swimmer #2) and a timestamp representative of a time at which each image frame was taken (shown as timestamp #1 and timestamp #2). Using this methodology, a coordinate value ($X_{ST}$, $Y_{ST}$) can be assigned to a location of each swimmer within the captured image frames 20, 22 where X identifies a position along the X-axis, Y identifies a position along the Y-axis, S identifies the swimmer, and T identifies the timestamp. This image-based coordinate may be defined relative a positioning of the camera 12 capturing the associated image and may be sufficient to determine a location from a single image, as opposed to having to take multiple pictures before fixing the location. In some cases, multiple cameras 12 may be used to capture images of different and/or overlapping portions of the pool. The resulting image-based coordinates may be defined locally to that associated camera 12 and thereafter the spatial relationship of one or more the cameras 12 may be used to reduce the image-based coordinates into some other coordinated system and/or to check the relative accuracy/precision of the other coordinates.

A location computer 34 may be configured to host the image process unit 32 and to output the image-based coordinate values as raw representations of the swimmer's location within the images 20, 22 and/or the image processing unit 32 may be configured to convert or otherwise process the image coordinates into world coordinates, global position system (GPS) coordinates, and/or some other coordinate orientation that has an absolute coordinate other than the camera or pool 18. The coordinate information may then be communicated to a host computer 36 for further processing. The host computer 36 may include a server 38 to host a planning application 40 and a training application 42 along with middleware 44 and temporary data storage 46 to facilitate interaction with other elements of the system 10 and to otherwise supporting data and processing demands necessary to supporting the operations contemplated herein.

The train application 42 may be a tool that tracks and otherwise processes telemetry information for the swimmers based at least in part on the coordinate information output from the location computer 34. FIG. 2 illustrates a performance telemetry image frame 48 to illustrate how some of the metrics contemplated by the present invention may be calculated based on the coordinate values, such at but not limited to distance traveled and speed. The performance telemetry image frame 48 can be used as a superimposition of two or more of the image frames 20, 22 where movement of the swimmers between images frames can be graphically illustrated with a first reference vector 50 and a second reference vector 52. The length of the vectors 50, 52 can be used to represent distance traveled which can then be used to calculate speed according to a time elapsed between the first and second timestamps.

Figure 3:
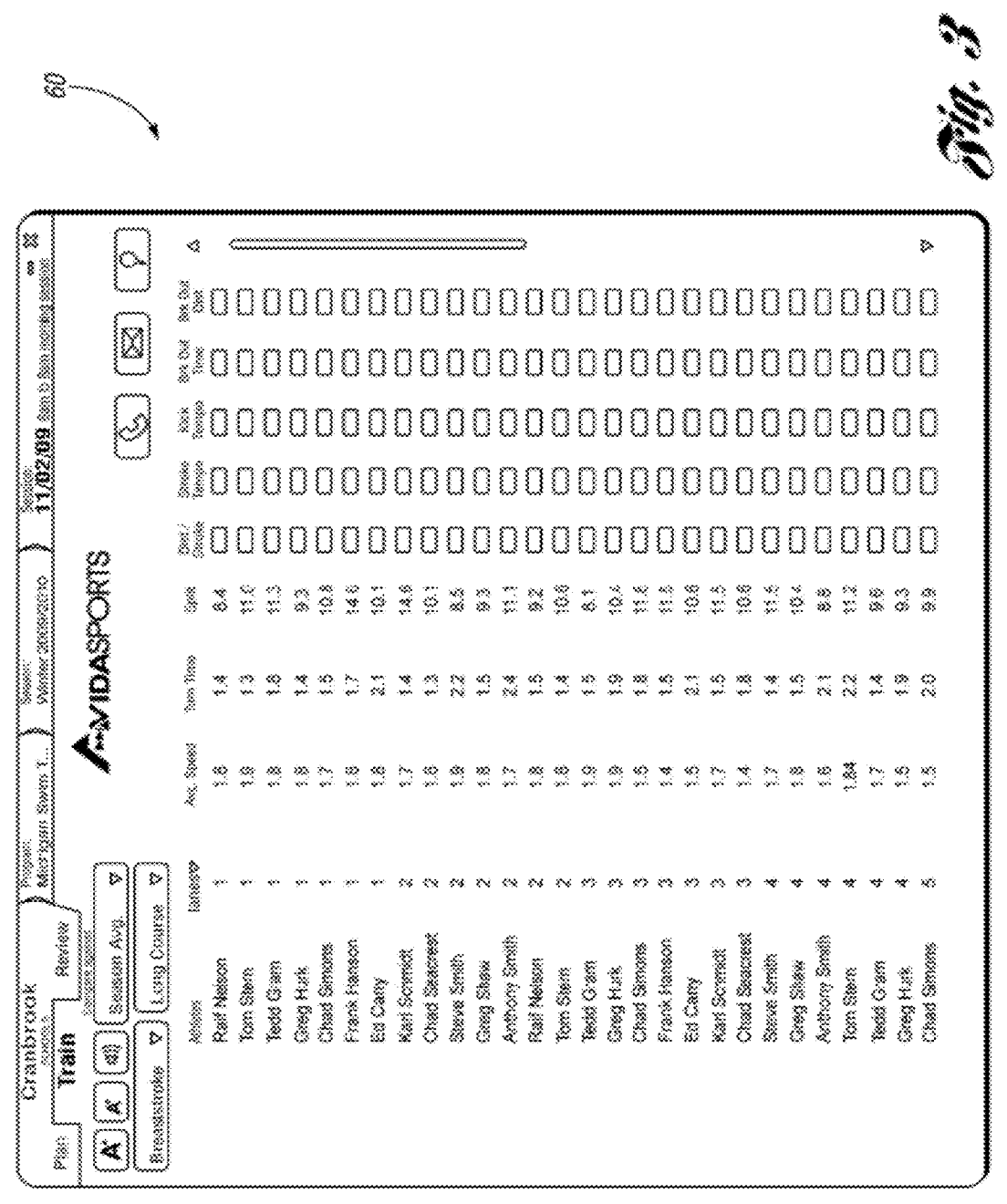

The exemplary illustration of distance and speed is not intended to limit the scope and contemplation of the present invention as the present invention fully contemplates including the coordinated representations in any type of a calculations, particularly calculations that are specified to the actions and movements of element being tracked with the device 14. FIG. 3 illustrates a display 60 of exemplary performance metrics that may be generated based at least in part on the coordinate values. In some cases, the performance telemetry may be based in part on additional information collected from the swimmers, such as based on information collected from limb devices 62 attached to arms and legs of the swimmers (see FIG. 1). The limb devices 62 may be include accelerometers or other devices configured to monitor and report movements of the swimmer to the master station 16, such as through wireless communications. The data transmitted form the limb devices 62 may be sent in real-time and coordinated with the real-time calculation of the coordinate values to provide a real-time analysis of the swimmers actions, i.e., stroke rate, stroke style, speed, splits, etc.

Figure 4:
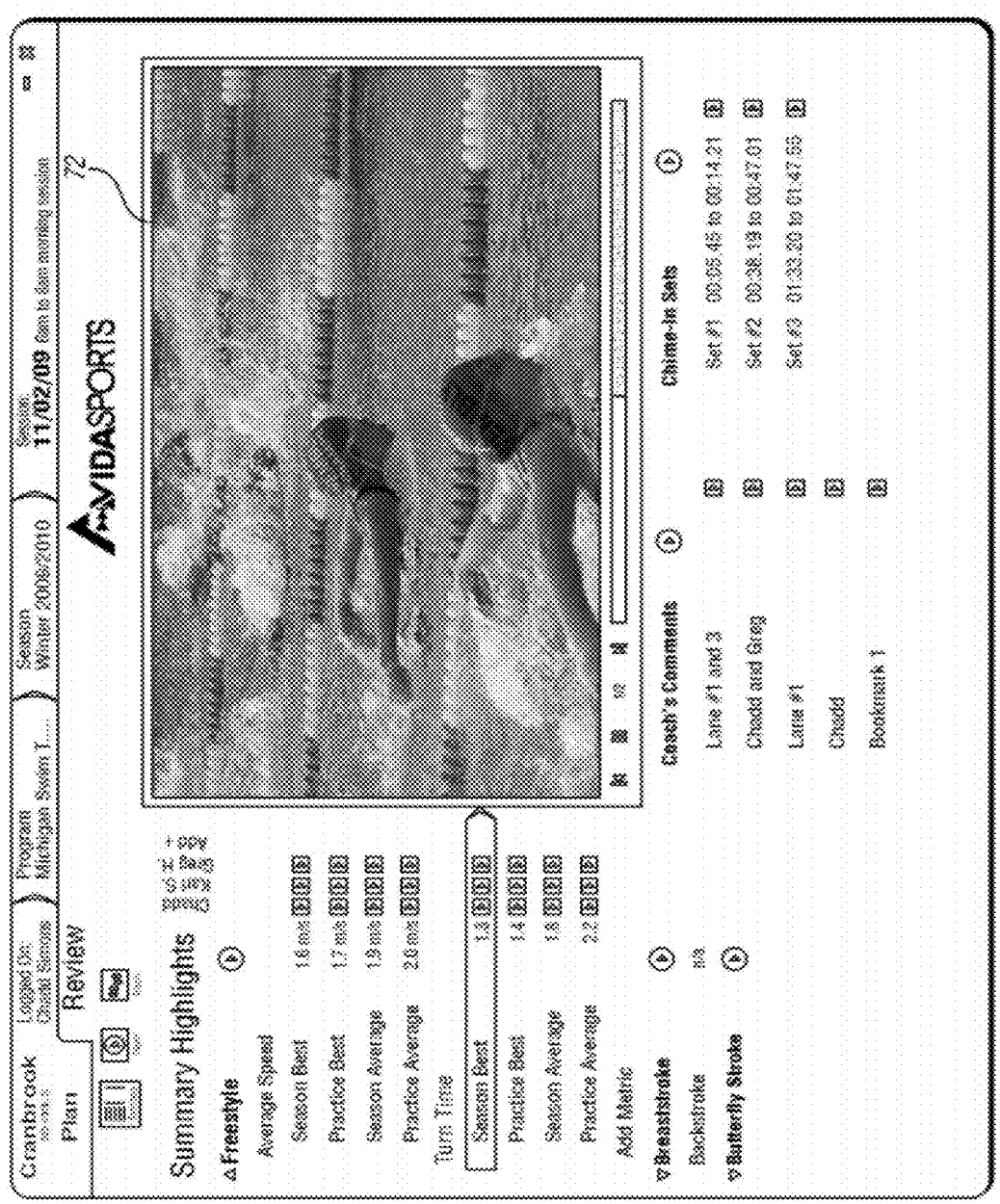
FIG. 4 illustrates a graphical user interface in accordance with one non-limiting aspect of the present invention.

The real-time telemetry may be output on a user interface of a hand-held user device 66 (see FIG. 1) connected to the master station 16 by way of a wireless node 68, such as but not limited to a tablet computer used by a coach to monitor swimmer performance. FIG. 4 illustrates one exemplary configuration of a graphical user interface 70 where the telemetry information of a particular swimmer is display with numerical values of current performance, and optionally, with color coded references to whether the swimmer is performing at, below, or above past averages/metrics. The performance telemetry may be displayed relative to a video window 72 showing a real-time video of the selected swimmer moving through the swimming pool. The video may be captured with one or more video cameras 74 (see FIG. 1) positioned around the swimming pool. The feeds from the video cameras 74 may be spliced together to provide a continuous video as the feed switches with movement of the swimmer between the cameras 74 placed at different locations along the pool and/or one or more of the cameras 74 may be configured to automatically move with the swimmer according to positional information determined from the coordinate values.

A central server 78 and one or more personal computers 80 may be included in the system 10 (see FIG. 1) to facilitate storing the performance telemetry for any number of swimmers and to allow the swimmers to retrieve the telemetry data and recorded video at later time for review. The central server 78 may include a billing application 82 and registration application 84 to facilitate managing online content and subscription based services to the performance telemetry. Online social networks may be established to facilitate remote training and competitions between swimmers swimming at different swimming pools across the country. One of the advantageous contemplated by the present invention relates to its ability to provide real-time feedback during practice and retrieval feedback at a later time, such as to support film study and review by the swimmer themselves. The system 10 supports a full spectrum of performance telemetry and is particularly suited to performance telemetry of the type that is based at least in part on obtaining a positional location of the tracked entity.

The positional tracking described above relies on a camera 12 or other sensor to positionally orientate a signal from one or more beacons 28, 30 included on a swimmer. This methodology is believed to be particular beneficial to supporting the real-time performance telemetry contemplated by the present invention since it allows the master station 16 or some other entity other than the head device 14 to perform the positional calculations. This can be helpful in reducing the size, complexity, and cost of the head device 14, although the present invention fully contemplates configuring the head device 14 to calculate their own positional coordinates through wireless communication and processing of the image frames 20, 22. The head device contemplated by one non-limiting aspect of the present invention, however, may include wireless communication capabilities and other capabilities necessary to implementing the objectives of the present invention, such as but not limited to having an transceiver (not shown) to support one-way or two-way information exchange and processing over a wireless system established with the master station.

The wireless system may be used by both of the limb and head devices 14, 62 to facilitate wireless communications with the master station 16. The limb device communications may be used to transmit accelerometer, biometric, and other types of data collected by the limb devices 62 to the master station 16. The wireless communications may be facilitated with the use of MAC address or other unique addresses assigned to each of the head and limb devices 14, 62 so that messages sent to and received from the head devices 14, 62 can be uniquely identified and controlled. The master station 16 may include a table or other representation to further correlated the MAC address with particular swimmers, such as by requiring each swimmer to log-in prior to practice or to otherwise identify themselves with a particular head device.

The master station 16 may further associate the head device with a particular signature or other unique representation to be output from the associated beacon 28, 30 so that each beacon 28, 30 shown within the image frames can be identified with a particular swimmer.

One non-limiting aspect of the present invention contemplates the beacons 28, 30 emitting signals with a self-identifying pattern (such as but not limited to emitting signals at particular sequence or flash rate) and/or at a predefine interval of time. The self-identifying pattern may be a slightly more complex signature since it may require the master station 16 to assign and decipher unique patterns for a number of head devices 14, which can be difficult should there be 50 or 100 swimmers being tracked at the same time. The predefined interval assignment process may be less complex since it may only require the master station 16 to monitor an epoch assigned to each of the head devices 14 for beacon transmissions. Each beacon 28, 30, optionally, may be assigned a unique epoch where it is the only beacon transmitting a signal at a particular period of time. In this scenario, the timestamp associated with each image frame can be cross-referenced with the beacon 28, 30 assigned to transmit during that period of time to identify the one or more beacons 28, within the image frame 20, 22. In this manner, the present invention is able to generate positional coordinate locations for the swimmer without requiring the head device 14 to calculate its own position.

Figure 5:
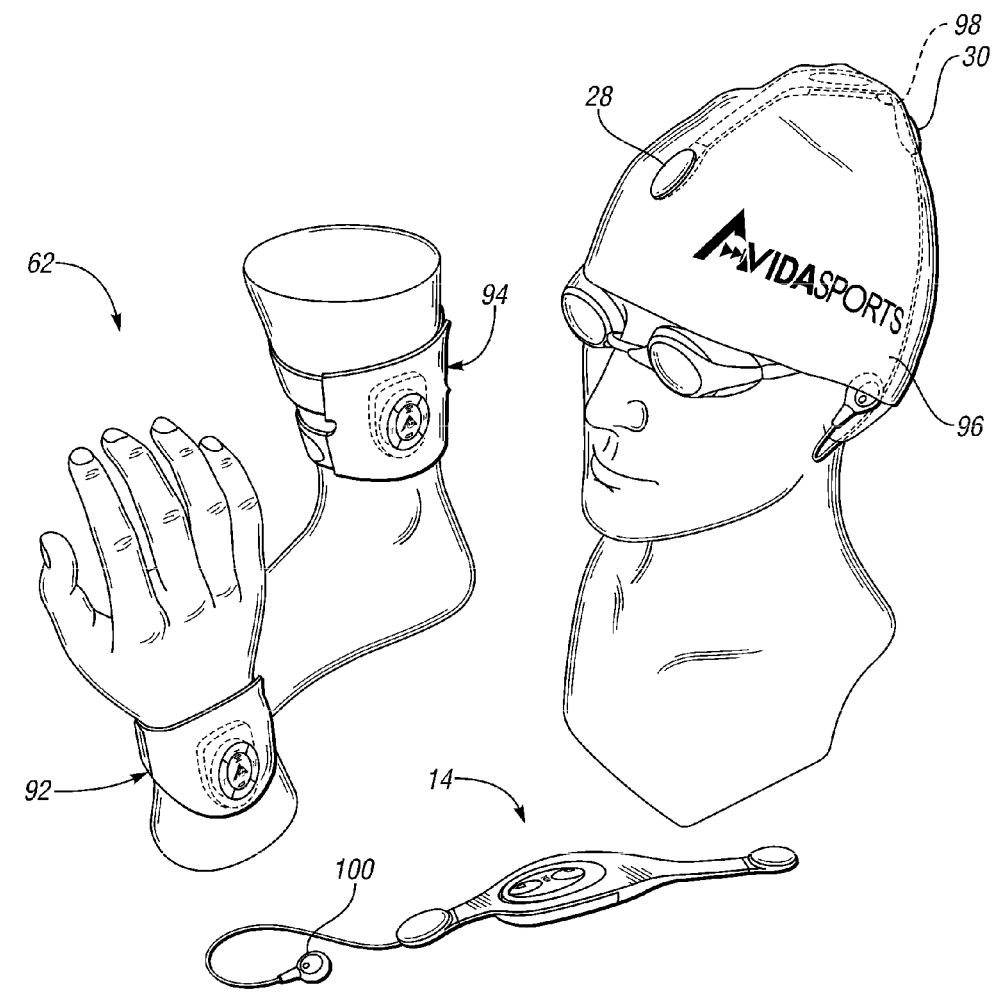
FIGS. 5-6 illustrate head and limb devices in accordance with one non-limiting aspect of the present invention.

The head and limb devices 14, 62 may be battery powered and waterproof/resistance to support wireless operation within the swimming pool and other environments. A docketing station 90 having ports for each set of the limb and head devices 14, 62 may be included in the system to facilitate battery charging, and optionally, software loading and updating. FIG. 5 illustrates the head and limb devices 14, 62 being particularly configured to support operation with a swimmer in accordance with on non-limiting aspect of the present invention. The limb device 62 may be configured for receipt within a wrist wrap 92 and an ankle wrap 94. The head device 14 may be configured with the first beacon 28 and the second beacon 30 that protrude through corresponding openings within a swim cap 96. The swim cap 96 may include an envelope 98 or other structure to position the first and second beacons 28, 30 relative to the openings.

While the use of both of the first and second beacons 28, 30 is not required, it may be helpful to have one or more of the beacons 28, 30 emitting the signal. Optionally, the master station 16 may assign each of the first and second beacon 28, 30 their own transmission interval so that only one beacon is transmitting within each image frame 20, 22. The first beacon 28, for example, can be used when the swimmer is performing a breaststroke or other action where the rearward portion of the head may be pointing away from the camera, such as towards a bottom of the pool or other direction where refraction/reflection may prevent a proper reading of the signal from the rearward beacon 30. Similarly, the second, rearward beacon 30 may be used when the swimmer is performing a freestyle stroke or other action where the forward portion of the head may be pointing away from the camera, such as towards a bottom of the pool or other direction where refraction/reflection may prevent a proper reading of the signal from the forward beacon 28. The emitting beacon 28, 30 may be selected based on accelerometer data collect from the limb device 62, such as through direct wireless communications between the limb and head devices 62, 14 or by way of master station 16 wireless communications, and/or the head device 14 may include an accelerometer to make its own determination.

Figure 6:
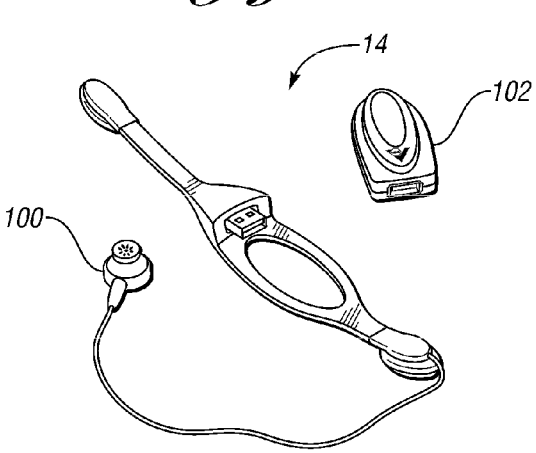

The head device 14 is further shown to include an ear bud 100. The ear bud 100 may be used to facilitate audio communications with the simmer. One form of audio communication may include the master station 16 or other device wireless transmitting verbal instructions from the coach to the swimmer, such as through a microphone (not shown) included on the tablet device. Another form of audio communication may include the head device 14 being programmed, either wireless while the swimmer is swimming or before, to issue chimes and other audio references to swimmer to indicate distance traveled, stroke rhythm, etc. and/or to simply play music. As shown in FIG. 6, the head device 14 may include a detachable pod 102 that can be connected through a USB port to the charging station 90.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of positionally identifying swimmers swimming within a swimming pool, the method comprising:
    associating an identification generated for each swimmer with a head device to be worn while the swimmer swims within the swimming pool;
    controlling a beacon included within each head device to emit a signal at an interval specified within a beacon transmission schedule;
    controlling a camera to record images representative of at least a portion of the swimming pool, each image plotting recorded signals within a two-dimensional field defined by a viewing angle of the camera;
    calculating image-based positional coordinates for each signal appearing within each of the captured images, the image-based positional coordinates defining spatial positioning of the beacons emitting the signals relative to the two-dimensional field of each image;
    reducing the image-based positional coordinates to pool-based positional coordinates, the pool-based positional coordinates defining spatial positioning of the beacons emitting the signals within at least a two-dimensional coordinate system defined relative to at least a length and width of the swimming pool; and
    for each of the images, identifying the swimmer at each of the pool-based positional coordinates based on the identification of the swimmer scheduled to emit signals at the time the image was captured.

2. The method of claim 1 further generating the beacon transmission schedule such that each beacon emits the signal only at the intervals during which no other beacons are scheduled to emit the signal.

3. The method of claim 1 further comprising controlling each beacon to emit the same signal.

4. The method of claim 1 further comprising controlling a first one and a second one of the beacons scheduled to emit signals during the same interval to uniquely issue the signal such that the signal emitted from the first one of the beacons is different from the signal emitted from the second one of the beacons.

5. The method of claim 1 further comprising wirelessly transmitting the beacon transmission schedule to each head device with signals emitted from a master station having a wireless range sufficient to support wireless communications with the head devices while each swimmer is within the swimming pool.

6. The method of claim 1 wherein each beacon includes a forward infrared (IR) source and a rearward IR source positioned respectively at a forward end and a rearward end of a swim cap used to secure each head device to the swimmers, and wherein the method further comprises controlling the beacon to emit the signal from at least one of the forward and rearward IR sources.

7. The method of claim 6 further comprising selecting only one of the forward and rearward IR sources to emit the signal depending on a stroke being performed by the swimmer.

8. The method of claim 7 further comprising determining the stroke from information wirelessly collected from one or more accelerometers included on the swimmer.

9. The method of claim 7 further comprising controller the beacon to emit the signal from the rearward IR source when the stroke requires a face of the swimmer to be facing a bottom of the pool.

10. The method of claim 7 further comprising controller the beacon to emit the signal from the forward IR source when the stroke requires a head of the swimmer to be facing a top surface of the pool.

11. The method of claim 1 further comprising:
calculating each of a distance traveled and a rate of speed for each swimmer having signals captured within at least two images, the distance traveled and the rate of speed being based at least in part on a change in position of the swimmer as represented by movement of the beacon within between at least two images;
graphically outputting at least the distance traveled and the rate of speed on a user interface in real-time while the swimmers travel within the swimming pool based at least in part on signals wirelessly communicated from a master station used to calculate the distance traveled and the rate of speed;
automatically controlling a video camera to record video of one or more of the swimmers by controlling a viewing angle of the video camera to move with the one or more swimmers as the swimmers travel within the pool, the controlling of the viewing angle being based at least in part of the locations of the swimmer; and
wirelessly transmitting audio signals from the master station to one or more of the head devices, the audio signals being processed by an audio component of the head device for output within an ear of the associated swimmer.

12. A method of generating positional coordinates for a plurality of moving objects, the method comprising:
instructing each of the plurality of objects to emit a locating signal according to a schedule, the schedule being set such that each of the plurality of objects is scheduled to emit the locating signal during a different period of time;
capturing images of an area in which the plurality of objects are moving with one or more cameras, each image fixing a representation of any locating signals appearing at a time of capture;
calculating positional coordinates for each of the representations, the positional coordinates reflecting a position of the object at the time of capture relative to the camera capturing the image having the representation; and
associating the positional coordinates with the plurality of moving objects by cross-referencing the positional coordinates for each time of capture with the one of the plurality of moving objects scheduled to emit the locating signal at the time of capture.

13. The method of claim 12 further comprising emitting the same locating signal from each of the plurality of objects.

14. The method of claim 12 further comprising emitting each locating signal at a wavelength that remains fixed throughout a portion of the period of time during which the signal is being emitted.

15. The method of claim 12 further comprising emitting each locating signal at a modulation frequency that remains fixed throughout a portion of the period of time during which the signal is being emitted.

16. The method of claim 12 further comprising emitting each locating signal without modulating the signal to include locational information such that positional coordinates are generated based on the locating signals but without requiring the moving objects to generate the positional coordinates.

17. The method of claim 12 further comprising dynamically varying the locating signal according to wireless instructions received from a master station positioned with a wireless range of each of the plurality of objects.

18. A locating system comprising:
a plurality of devices each having a beacon configured to emit a non-modulated signal at a fixed wavelength;
one or more cameras configured to take pictures of an area defined by a viewing angle of each camera;
a master station configured to wirelessly communicate a broadcast schedule to each of the plurality of device, the broadcast schedule specifying a period of time during which each beacon is to emit the non-modulated signal; and
wherein the master station is configured to generate positional coordinates for each beacon appearing within each of the pictures based on the beacon scheduled to emit the non-modulated signal at the time the picture was taken and a position of the camera taking the picture.

19. The system of claim 18 wherein each of the plurality of devices includes an ear bud configured to output audio based on audio stored on each of the plurality of devices or wirelessly received from the master station.

20. The system of claim 10 wherein each beacon includes a forward infrared (IR) source and a rearward IR source positioned respectively at a forward end and a rearward end of a swim cap used to secure each device to a swimmer, and wherein one or both of the forward and rearward IR sources are selectively controlled to emit the non-modulated signal depending on a stroke being performed by the swimmer.

* * * * *